(12) United States Patent
Suh (10) Patent No.: US 7,879,504 B2
(45) Date of Patent: Feb. 1, 2011

(54) FUEL CELL STACK HAVING IMPROVED COOLING STRUCTURE

(75) Inventor: Dong-Myung Suh, Suwon-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 1273 days.

(21) Appl. No.: 11/185,628

(22) Filed: Jul. 19, 2005

(65) Prior Publication Data
US 2006/0046117 A1    Mar. 2, 2006

(30) Foreign Application Priority Data
Aug. 30, 2004   (KR) .................. 10-2004-0068740

(51) Int. Cl.
H01M 8/04    (2006.01)
H01M 8/02    (2006.01)
(52) U.S. Cl. ............... 429/457; 429/456; 429/434; 429/433
(58) Field of Classification Search .............. 429/26, 429/34, 39, 120
See application file for complete search history.

(56) References Cited

U.S. PATENT DOCUMENTS 4,324,844 A * 4/1982 Kothmann .............. 429/26

FOREIGN PATENT DOCUMENTS

| CN | 1367939 | | 9/2002 |
|---|---|---|---|
| JP | 57-852 | | 1/1982 |
| JP | 60-147165 | U | 9/1985 |
| JP | 62-268062 | A | 11/1987 |
| JP | 1-105474 | | 4/1989 |
| JP | 3-261073 | A | 11/1991 |
| JP | 8-153525 | A | 6/1996 |
| JP | 2570771 | | 10/1996 |
| JP | 2000-090943 | * | 3/2000 |
| JP | 2003-68317 | A | 3/2003 |
| JP | 2004-152537 | * | 5/2004 |
| JP | 2004-234981 | A | 8/2004 |
| KR | 20-0161075 | | 11/1999 |
| WO | WO 00/24066 | | 4/2000 |
| WO | WO 2004/047205 A2 | * | 6/2004 |

OTHER PUBLICATIONS

Patent Abstracts of Japan, Publication No. 01-105474, dated Apr. 21, 1989, in the name of Nobuyuki Arima.
Patent Abstracts of Japan, Publication No. 2004-152537, dated May 27, 2004, in the name of Takeshi Ishikawa.
Korean Utility Model Abstracts (Y1), Publication No. 20-0161075, dated Nov. 15, 1999, in the name of Kyun-Young Ahn.
Patent Abstracts of Japan for Publication No. 2000-090943; Date of publication of application Mar. 31, 2000, in the name of Tomohisa Wakasugi, et al.
Patent Abstracts of Japan for Patent No. 2570771; Date of registration of application Oct. 24, 1996, in the name of Nobuyuki Arima.

* cited by examiner

Primary Examiner—Dah-Wei Yuan
Assistant Examiner—Angela J. Martin
(74) Attorney, Agent, or Firm—Christie, Parker & Hale, LLP

(57) ABSTRACT

A fuel cell stack that includes at least one electricity generator generating electric energy through an electrochemical reaction between hydrogen and oxygen and a cooling system are provided. The electricity generator includes a membrane-electrode assembly, separators on both sides of the membrane-electrode assembly, and cooling channels placed approximately parallel to a first direction of the membrane-electrode assembly, where a coolant flows through the cooling channels, and where the cooling channels have different distribution densities in a direction perpendicular to the first direction of the membrane-electrode assembly.

15 Claims, 7 Drawing Sheets

FUEL CELL STACK HAVING IMPROVED COOLING STRUCTURE

CROSS REFERENCE TO RELATED APPLICATION

This application claims priority to and the benefit of Korean patent application No. 10-2004-0068740 filed in the Korean Intellectual Property Office on Aug. 30, 2004, the entire content of which is incorporated herein by reference.

FIELD OF THE INVENTION

The present invention relates to a fuel cell system and more particularly to a stack having an improved cooling structure and a fuel cell system having the stack.

BACKGROUND OF THE INVENTION

In general, a fuel cell is an electricity generating system directly converting chemical reaction energy into electric energy through an electrochemical reaction between the oxygen in air and the hydrogen contained in a hydrocarbon fuel such as methanol, ethanol, or natural gas.

A polymer electrolyte membrane fuel cell (PEMFC), recently developed, has excellent output characteristics, low operation temperatures, and fast starting and response characteristics. A basic PEMFC includes a stack, a fuel tank, and a fuel pump supplying the fuel from the fuel tank to the stack. The stack is the main body of the fuel cell. The PEMFC may further include a reformer reforming the hydrocarbon fuel to generate hydrogen to be supplied to the stack.

During operation of the PEMFC, the fuel stored in the fuel tank is supplied to the reformer by a fuel pump. The reformer reforms the fuel and generates hydrogen. The stack generates electric energy through an electrochemical reaction between the hydrogen and the oxygen. Heat is also generated as a byproduct of this process.

In the above fuel cell system, the stack generating electric energy is constructed with several to tens of unit cells each having a membrane-electrode assembly (MEA) and a separator. A separator is also referred to as a bipolar plate in the art.

The MEA has an anode and a cathode attached on both surfaces of an electrolyte membrane. The separator serves as a passage through which hydrogen and oxygen needed for reactions of the fuel cell are supplied to the anodes and cathodes on the electrolyte membrane. In addition, the separator serves as a conductor serially coupling the anodes and cathodes of the MEA.

Through the separator, the hydrogen-containing fuel is supplied to the anode, and oxygen or oxygen-containing air is supplied to the cathode. During the process, electrochemical oxidation of fuel occurs at the anode, and electrochemical reduction of oxygen occurs at the cathode, causing a flow of electrons. Electricity, heat, and water can be obtained from the electron flow.

The stack must be maintained at a proper operating temperature in order to secure stability of the electrolyte membrane and to prevent deterioration in performance of the electrolyte membrane. For this reason, the stack has cooling channels. A low temperature coolant such as water or air flowing through the cooling channels can cool the heated stack. Cooling depends on how much the cooling channels can contact the MEA of each unit cell and carry its heat away by conduction. The measure of contact between the cooling channels and the unit cell is contact area of the cooling channels per unit area of the unit cell.

In the conventional fuel cell system, there is a temperature difference between central and circumferential regions of the unit cell in the stack, because the circumferential areas may be cooled by adjacent air. Yet, the contact area of the cooling channel per unit area of the unit cell remains the same among different regions of the unit cell. Because the temperature difference between different regions of the unit cell is not addressed by the cooling system, the cooling efficiency of the stack decreases and the stack performance deteriorates.

SUMMARY OF THE INVENTION

The embodiments of the present invention provide a fuel cell stack having an enhanced structure of cooling channels capable of improving cooling efficiency and performance of a stack.

In one exemplary embodiment of the present invention, a fuel cell stack includes at least one electricity generator generating electric energy through an electrochemical reaction between hydrogen and oxygen. The electricity generator includes a MEA, separators located on both sides of the MEA, and cooling channels located along a predetermined direction of the MEA, wherein a coolant flows through the cooling channels, and wherein the cooling channels are provided with a different distribution density along a direction perpendicular to the predetermined direction.

In variations of the present invention, the distribution density of the cooling channels may increase from a circumferential region to a central region of the MEA.

In addition, the cooling channels may be symmetrically distributed with respect to a central line of the MEA. The cooling channels may be constructed with ribs and grooves. According to one embodiment, the grooves may have a constant width while the ribs have at least two different widths. The widths of the ribs may gradually decrease from the circumferential region to the central region of the MEA. According to another embodiment, the ribs may have a constant width while the grooves have at least two different widths. The widths of the grooves may gradually increase from the circumferential region to the central region of the MEA. The cooling channels may have a shape of a straight line. The cooling channels may have a shape of a curved line, wherein curvatures of the curved lines of the cooling channels gradually increase from the central region to the circumferential region of the MEA. The stack may include a plurality of the electricity generators, wherein the cooling channels are formed by combining opposite separators. The stack may include a plurality of the electricity generators, wherein the cooling channels are formed in cooling plates located between the electricity generators.

According to the embodiments of the current invention, the contact area of a coolant with the electricity generators, that also generate heat, is varied in various regions of the stack according to the temperature difference between the region of the stack and the coolant. By increasing the contact area between the coolant and the electricity generators in the central regions of the stack where heat does not have the opportunity to dissipate into air, the cooling efficiency and performance of the stack is improved.

DETAILED DESCRIPTION

Figure 1:
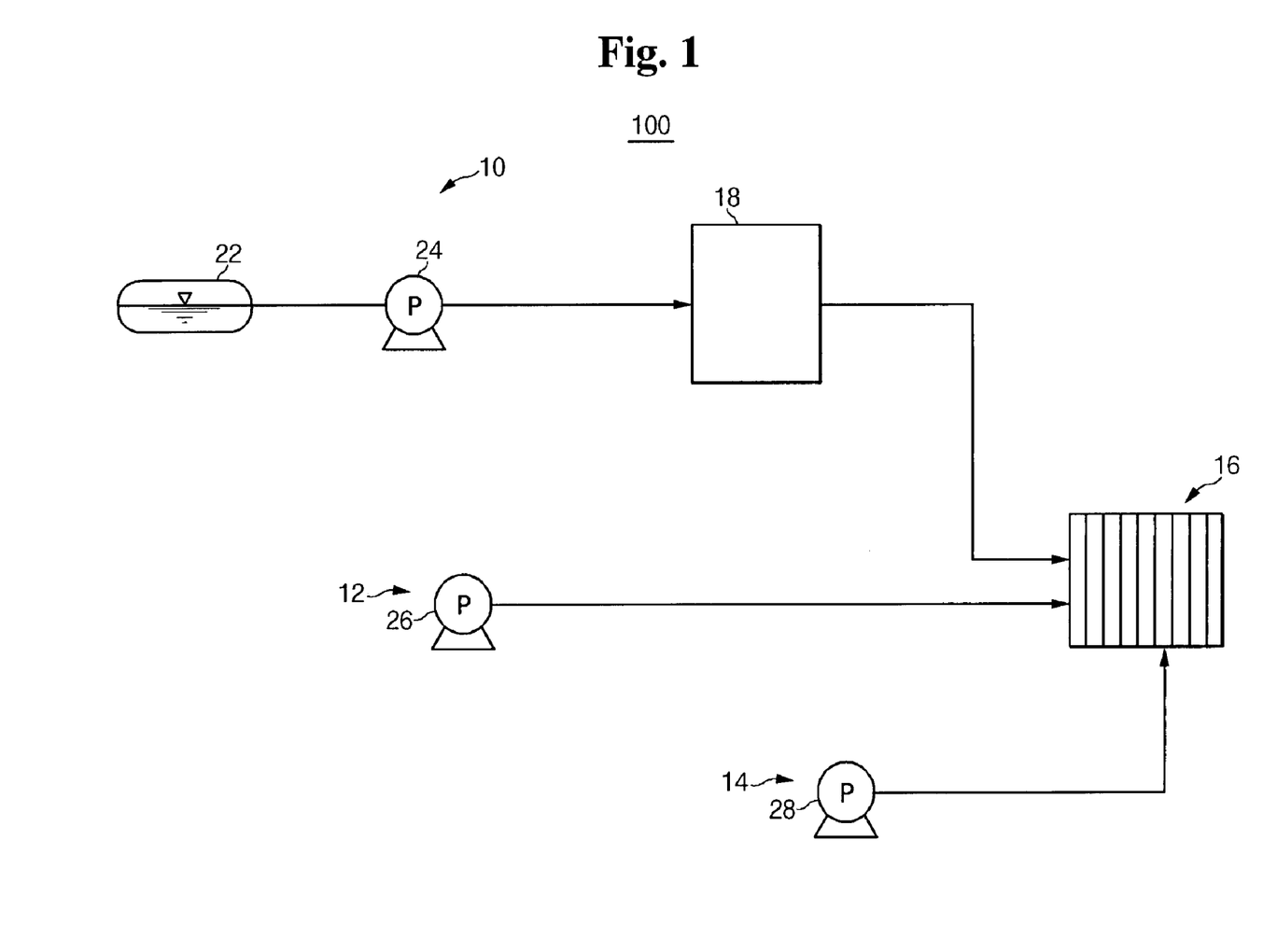
FIG. 1 is a schematic block diagram illustrating a fuel cell system according to embodiments of the present invention.

FIG. 1 is a schematic block diagram illustrating a fuel cell system 100 according to both embodiments of the present invention. The fuel cell system 100 may employ a PEMFC for generating hydrogen and for using the hydrogen to generate electric energy through an electrochemical reaction between the hydrogen and oxygen.

The fuel used for the fuel cell system 100 may include a liquid or gas hydrogen-containing fuel such as methanol, ethanol, or natural gas. For convenience of description, the fuel used in the following description is a liquid fuel. In addition, for an oxidant reacting with the hydrogen contained in the fuel, the fuel cell system 100 may utilize a pure oxygen stored in an additional storage device or may use oxygen from air. In the following description of the various embodiments, the oxygen in air is used.

The fuel cell system 100 of the present invention includes a reformer 18 reforming hydrogen-containing fuel to generate hydrogen, a stack 16 generating electric energy through an electrochemical reaction of the hydrogen and oxygen, a fuel supply unit 10 supplying the fuel to the reformer 18, and an air supply unit 12 supplying air to the stack 16.

The fuel cell system 100 may also employ a direct oxidation fuel cell scheme to generate electric energy by directly supplying a hydrogen-containing liquid fuel to the stack 16. Unlike the PEMFC, the direct oxidation fuel cell has a structure where the reformer 18 shown in FIG. 1 is eliminated. In the following description, the fuel cell system 100 employing the PEMFC scheme is used as an example while the present invention is not so limited and may include similar schemes.

The stack 16 is coupled to the reformer 18 and to the oxygen supply unit 12. The stack 16 receives a reformed gas and air from the reformer 18 and the oxygen supply unit 12, respectively, and generates electric energy through an electrochemical reaction between the hydrogen and oxygen contained in the air.

The fuel supply unit 10 includes a fuel tank 22 storing the fuel, and a fuel pump 24 coupled to the fuel tank 22 to discharge the fuel stored in the fuel tank to the reformer 18.

The oxygen supply unit 12 includes an air pump 26 drawing air and supplying the air to the stack 16 with a predetermined pumping pressure.

The reformer 18 has a general container which generates a reformed gas from the fuel thorough a chemical catalytic reaction using thermal energy and reduces a concentration of carbon monoxide contained in the reformed gas. The reformer 18 generates the reformed gas from the fuel through a catalytic reaction such as a steam reforming reaction, a partial oxidation reaction, or an auto-thermal reaction. In addition, the reformer reduces the concentration of carbon monoxide contained in the reformed gas through catalytic reactions such as water-gas shift (WGS) or preferential oxidation (PROX), or by hydrogen purification using a separation membrane.

Figure 2:
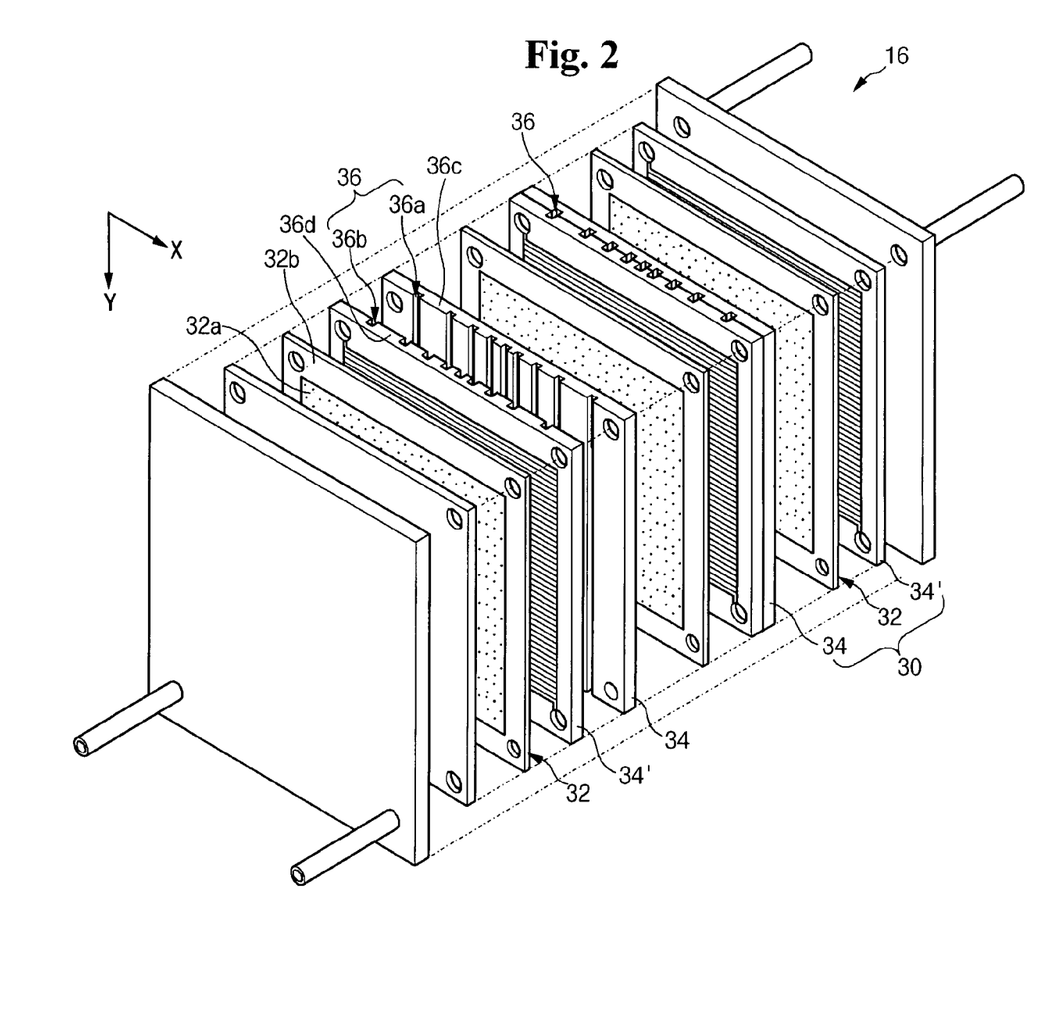
FIG. 2 is an exploded perspective view illustrating a stack according to a first embodiment of the present invention.

FIG. 2 is an exploded perspective view illustrating a stack 16 according to a first embodiment of the present invention. The stack 16 in the fuel cell system 10 includes electricity generators 30 as a minimum unit generating electric energy, in which separators 34, 34' are placed in close contact with both surfaces of a MEA 32. The separators are also referred to as "bipolar plates" in the art. The stack 16 is constructed by sequentially stacking a plurality of the electricity generators 30.

An anode is formed on one side of the MEA 12, and a cathode is formed on the other side of the MEA 12. The MEA 12 has an electrolyte membrane between the anode and the cathode. The anode receives the reformed gas through the separator 34. The anode is constructed with a catalyst layer decomposing the reformed gas into electrons and hydrogen ions and a gas diffusion layer promoting movement of the electrons and the reformed gas. The cathode receives the air through the separator 34'. The cathode is constructed with a catalyst layer for a reaction between the electrons, the hydrogen ions, and the oxygen contained in air that generates water. The cathode also includes a gas diffusion layer promoting flow of the oxygen.

The electrolyte membrane is made of a solid polymer electrolyte having a thickness of 50 μm to 200 μm. The electrolyte membrane has an ion exchange function for moving the hydrogen ions generated by the catalyst layer of the anode into the catalyst layer of the cathode.

The separators 34, 34' placed close to both sides of the MEA 32 supply the reformed gas, arriving from the reformer 18, and the air, supplied from the air pump 26, to the MEA 32, the anode, and the cathode. In addition, the separators 34, 34' serve as conductors serially coupling the anodes and cathodes.

During the operation of the fuel cell system 100, thermal energy is generated from the electricity generators 30 through a reduction reaction. Because thermal energy dries the MEA 32, the thermal energy is a factor in deteriorating performance of the stack. Therefore, the fuel cell system 100 of the present invention has a cooling structure for circulating a coolant within the stack 16 to cool the heated electricity generators 30.

The fuel cell system 100 includes a coolant supply unit 14 (FIG. 1) supplying the coolant to an interior of the stack 16. The stack 16 includes cooling channels 36 provided for the electricity generators 30 allowing the coolant supplied from the coolant supply unit 14 to flow though the electricity generators 30.

The coolant supply unit 14 includes a coolant pump 28 drawing and supplying the coolant with a predetermined pumping pressure. The coolant pump 28 is coupled to the cooling channels 36 in the stack 16 to supply the coolant to the electricity generators 30. In the present invention, the coolant may be a cooling water, or a cooling gas. In the embodiments described, air is used as the coolant, because air is easy to obtain and atmospheric air is usually at a temperature lower than an internal temperature of the stack 16 in operation.

The coolant supply unit 14 having the coolant pump 28 is used to forcibly supply the coolant to the stack 16. Alternatively, without any coolant supply unit 14, cooling air may be supplied to the cooling channels 36 though natural convection.

Each of the cooling channels 36 is a path of flow for the coolant, supplied from the coolant supply unit 14, into the electricity generator 30 to cool the heated electricity generator 30. The cooling channels 36 may have various shapes and may be located in various positions within the stack 16. In the stack 16 shown in FIG. 2, the cooling channels 36 are formed in the separators 34, 34'.

The cooling channels 36 are formed by combining one channel 36a located on a surface of the separator 34 and another channel 36b located on a surface of the opposite separator 34'. The MEA 32 is attached on one side of the combined separators 34, 34' where the cooling channels 36 are formed, so that the entire surface of the MEA 32 including active regions 32a and inactive regions 32b can be cooled.

In the embodiment shown, a plurality of the cooling channels 36 are located at varied intervals in the separators 34, 34' extending along one side of the MEA 32 that is, for example, the Y direction of FIG. 2. The cooling channels 36 are constructed with grooves 36a, 36b and ribs 36c, 36d located between the grooves 36a, 36b.

Figure 3:
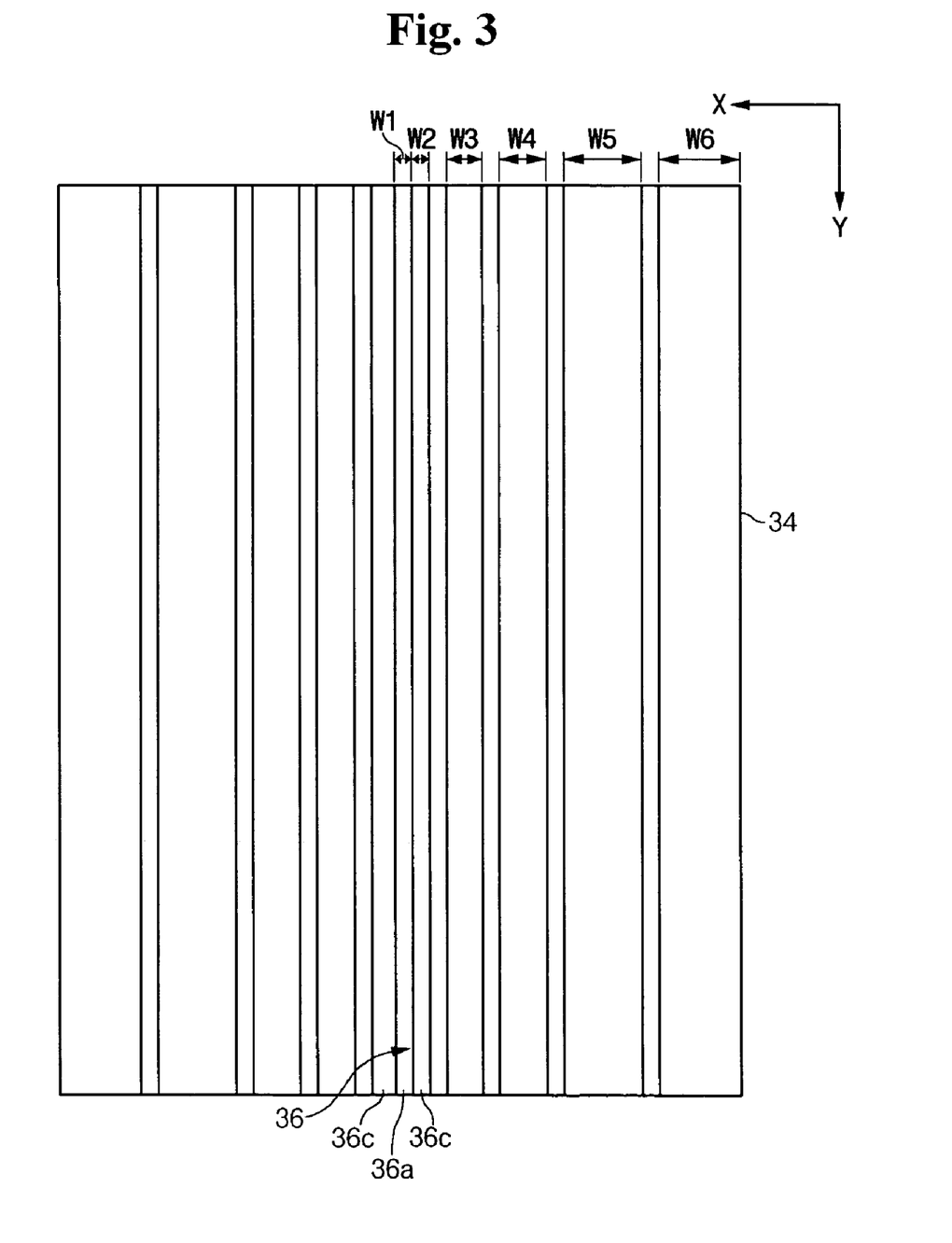
FIG. 3 is a plan view of cooling channels according to the first embodiment of the present invention.

FIG. 3 is a plan view of the cooling channels 36 in one of the separators 34, 34'. A plurality of the cooling channels 36 are located parallel to one another along the vertical direction (Y direction of the figure) of the separator 34. The distribution density of cooling channels 36 varies along a direction perpendicular to the direction of the cooling channels 36 (X direction of the figure). In the embodiment shown, the distribution density of the cooling channels 36 increases from the circumferential region to the central region of the MEA 32 or the separator 34.

The cooling channels 36 are constructed with grooves 36a having a constant width w1 and ribs 36c having at least two different widths. The embodiment shown in FIG. 3 includes five different widths w2, w3, w4, w5, and w6 for the ribs 36c. The widths of the ribs 36c gradually decrease in the direction from the circumferential region to the central region of the MEA 32 so that w2<w3<w4<w5<w6.

In the embodiment shown in FIG. 3, the cooling channels 36 are straight lines. At one end of the cooling channel 36, an inlet is formed through which the coolant supplied from the coolant supply unit 14 is injected. At the other end of the cooling channel 36, an outlet is formed through which the coolant is discharged from the cooling channel 36.

The cooling channels 36 are formed by assembling the two separators 34, 34' together. Grooves forming the inlet through which the coolant is injected, are formed at one end of the separators 34, 34' and grooves forming the outlet through which the coolant is discharged from the cooling channel 36 are formed at the other ends of the separators 34, 34'. Assembling the two separators 34, 34' together forms channels in between the two separators 34, 34' where the grooves meet.

The cooling channels 36 are not limited to the above layout. For example, the cooling channels 36 may have a layout where straight lines are located in an arbitrary interval on the separators 34, 34' and the ends of the straight lines are alternately coupled to one another, forming a continuous path between one inlet and one outlet. In this example, the inlet and outlet of the cooling channels 36 may be formed at the ends of first and last straight lines, respectively.

Moreover, although the cooling channels 36 are located parallel to each other and extending along the vertical direction of the separator 34 in the embodiment shown, alternatively, the cooling channels may extend along the horizontal direction of the separator 34.

By adjusting the distances between the ribs 36c, the cooling channels 36 may be distributed with a higher density in the central regions of the separators 34, 34' and with a lower density in the circumferential regions of the separators 34, 34'. There is a temperature difference between the central and circumferential regions of the electricity generator 30 of the stack 16 and the central regions usually require more cooling.

The circumferential regions may be cooler because they are cooled by the air surrounding the stack 16. In order to efficiently cool the stack 16, the temperature difference is taken into consideration.

The operation of the fuel cell system 100 is described below. During electricity generation by the stack 16, thermal energy is also generated from the electricity generators 30. This thermal energy is transferred to the separators 34, 34' of the electricity generators 30. The circumferential regions of the stack 16 are cooled by the air surrounding the stack 16. As a result, there is a temperature difference between the central and circumferential regions of the stack 16.

The coolant is supplied from the coolant supply unit 14 to the cooling channels 36. The coolant flowing through the cooling channels 36 cools the heated separators 34, 34'. Because the cooling channels 36 are distributed with different densities among the different regions of the separators 34, 34', the contact area between the coolant and the separators 34, 34' varies. The coolant flowing through the cooling channels 36 in the central region of the separators 34, 34' has a larger contact area with the separators 34, 34'. And, the coolant flowing through the cooling channels 36 in the circumferential region of the separators 34, 34', has a smaller contact area with the separators 34, 34'.

Within the stack 16, therefore, the thermal exchange between the central region of the electricity generators 30 that are generating the thermal energy, and the coolant, flowing through the cooling channels 36, is greater in the central region of the separators 34, 34', where more thermal energy is accumulated. The thermal exchange at the circumferential regions of the electricity generator 30 and the coolant is smaller in the circumferential regions of the separators 34, 34' where less thermal energy is accumulated. As a result, the stack 16 can be cooled according to the temperature characteristics of the different regions of the electricity generator 30.

Figure 4:
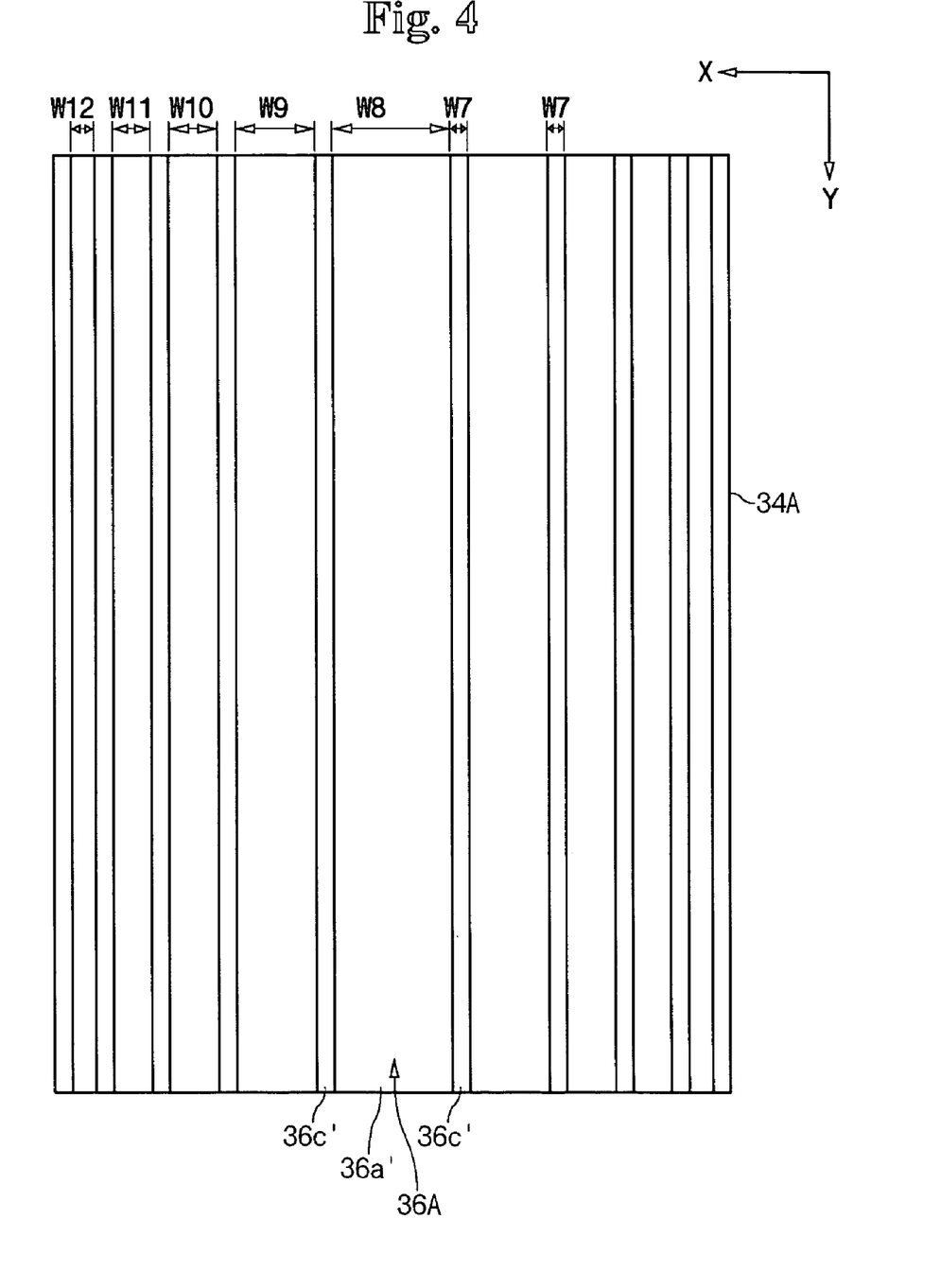
FIG. 4 is a plan view of cooling channels according to a first modified example of the first embodiment of the present invention.

FIG. 4 is a plan view of the cooling channels 36A according to the first modified example of the first embodiment of the present invention. Unlike the cooling channels 36 shown in FIG. 3, the cooling channels 36A are constructed with ribs 36c' having a constant width w7 and grooves 36a' having different widths w8, w9, w10, and w11.

In the first modified example of FIG. 4, the widths of the grooves 36a' of the cooling channels 36A in the central region of the separator 34A are larger than those in the circumferential region of the separator 34A. Accordingly, the contact area of the coolant per unit area of the separator 34A decreases from the center to the circumference.

The cooling channels 36A of the first modified example are constructed similarly to the cooling channels 36 of the first embodiment and operate similarly as well. Therefore, detailed description of the construction and operation of the first example is omitted.

Figure 5A:
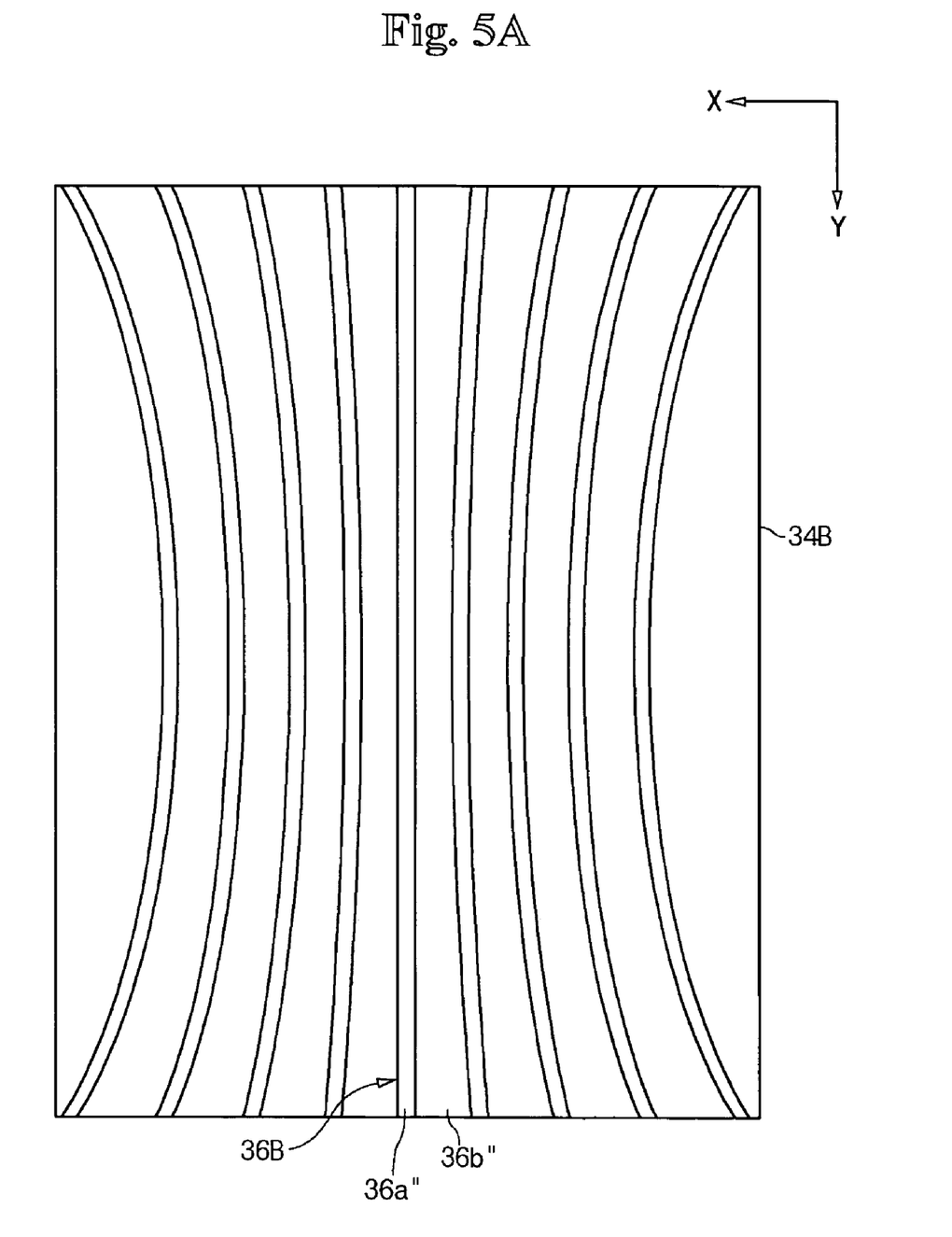
FIGS. 5A and 5B are plan views of cooling channels according to a second modified example of the first embodiment of the present invention.
Figure 5B:
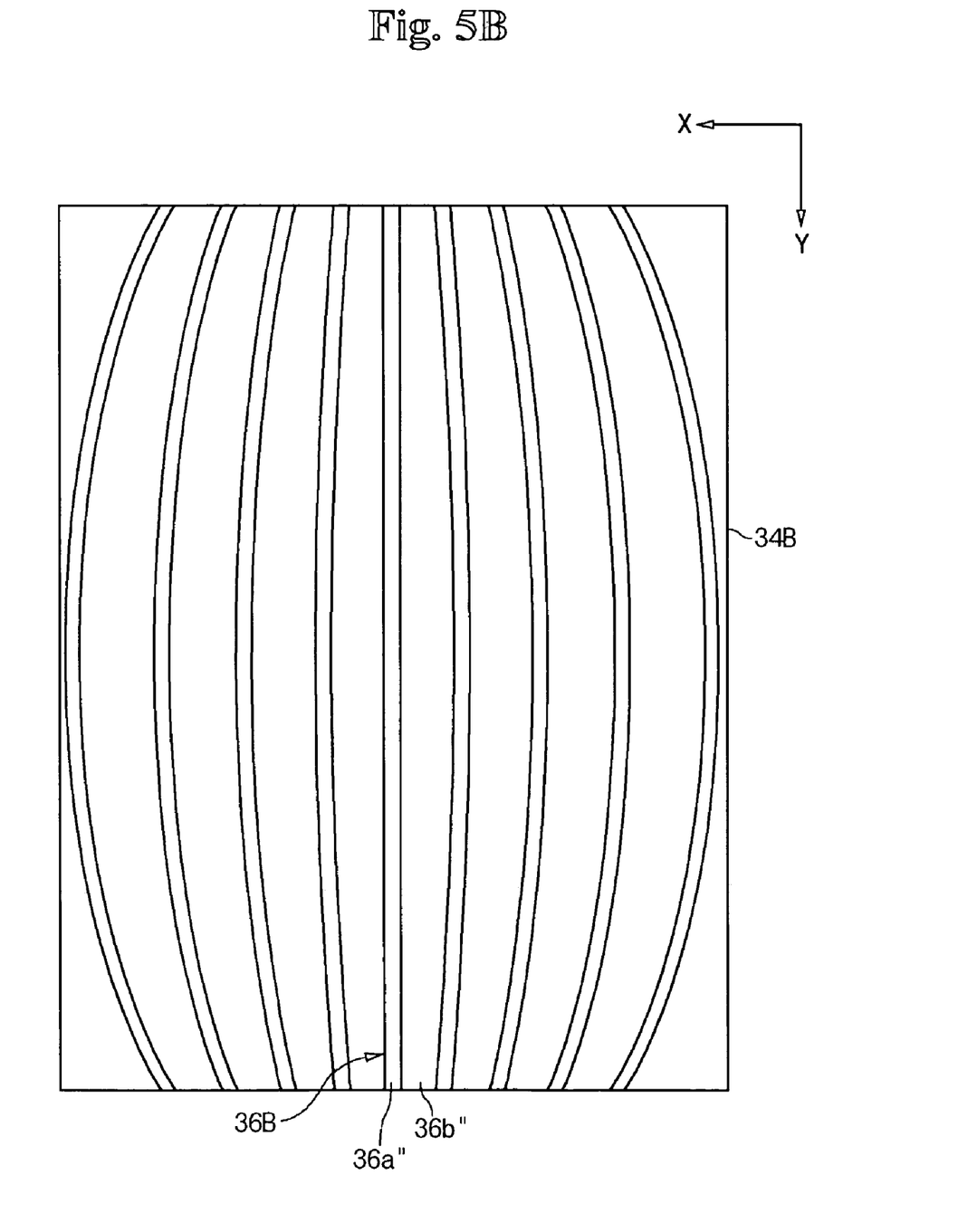

FIGS. 5A and 5B are plan views of cooling channels 36B according to a second modified example of the first embodiment of the present invention. Similar to the cooling channels of the first embodiment 36 and the first modified example of the first embodiment 36A, cooling channels 36B are constructed with grooves 36a" and ribs 36b". However, unlike the previous cooling channels 36, 36A which were straight lines, the cooling channels of the second modified example 36B are curved lines. The curvatures of the curved lines, forming the cooling channels 36B, gradually increase in a direction from the central region to the circumferential region of the separator 34B. In other words, the cooling channels 36B at or near the center region of the separator 34B are almost straight while the cooling channels 36B at or near the circumferential region have the highest curvatures.

The cooling channels 36B shown in FIG. 5A are convex with respect to the central line of the separator 34B. The cooling channels 36B shown in FIG. 5B are concave with respect to the central line of the separator 34B.

In the second modified embodiment, the shape of the cooling channels 36B changes, allowing the distribution density of the cooling channels 36B to change depending on the region of the separators 34B. This structure further improves the cooling efficiency of the stack 16.

Figure 6:
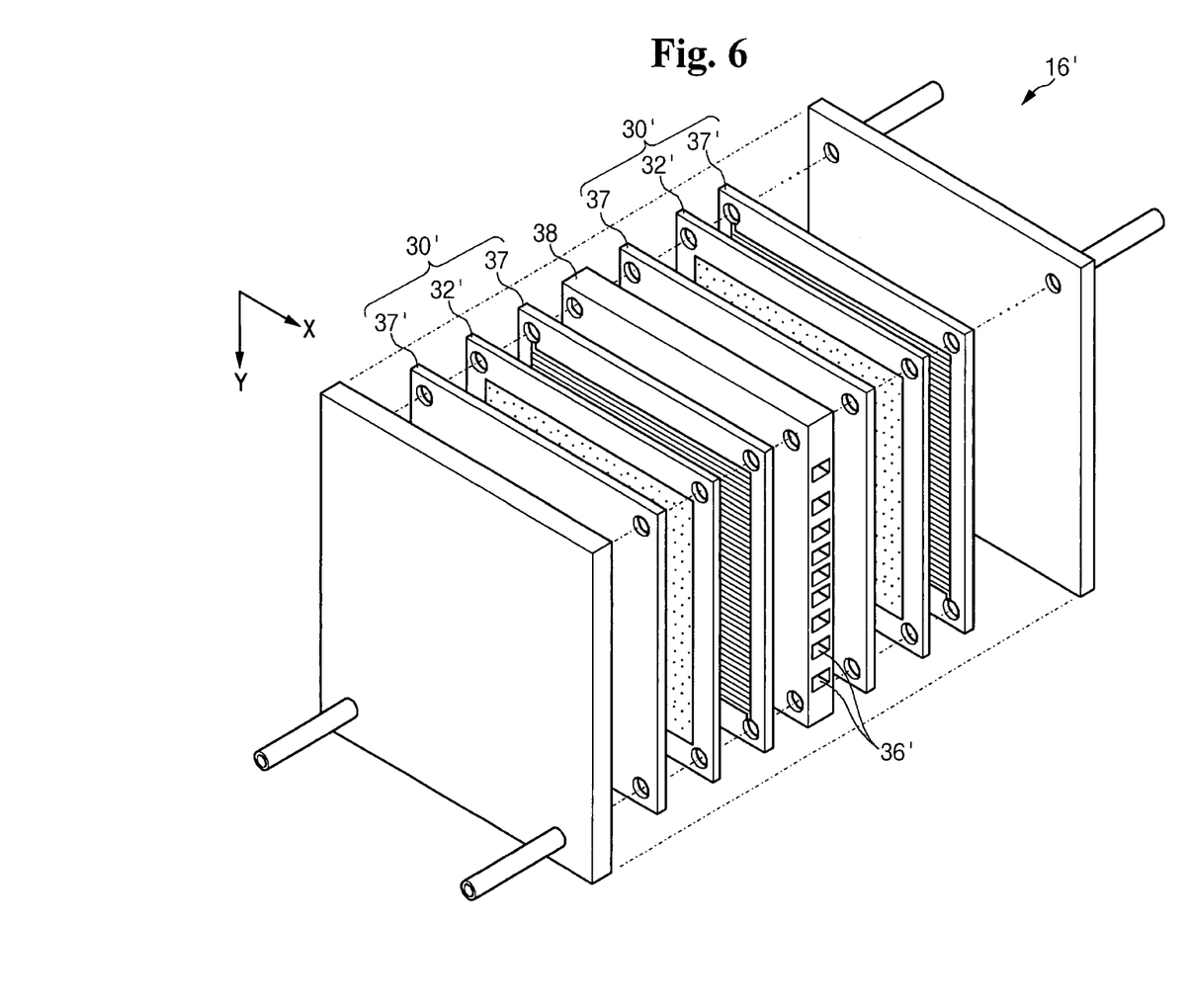
FIG. 6 is an exploded perspective view illustrating a stack according to a second embodiment of the present invention.

FIG. 6 is an exploded perspective view illustrating a stack 16' according to a second embodiment of the present invention. In comparison to the stack 16 of the first embodiment shown in FIG. 2, the stack 16' shown in FIG. 4 further includes cooling plates 38. The cooling plates 38 are interposed between adjacent electricity generators 30' and more specifically between the separators 37 and 37' of two adjacent electricity generators 30'. The cooling plates 38 function as heat release plates for releasing thermal energy transferred from the separators 37 and 37' during the operation of the electricity generators 30'.

Because the cooling plates 38 cool the entire MEA 32', cooling efficiency is improved. The cooling plates 38 may be made of a thermally-conductive material such as aluminum, cooper, iron, or any alloy of these elements.

A plurality of cooling channels 36' are formed within the cooling plates 38 and extend along one of the edges of the cooling plates 38, for example, the X direction in FIG. 6. The cooling channels 36' of the second embodiment receive the coolant from the coolant supply unit 14 shown in FIG. 1 and cool the stack 16'. These cooling channels 36' operate similarly to the cooling channels 36, 36A, 36B that were previously discussed. Therefore, detailed description on the construction and operations of these channels is omitted.

The present invention is not limited to the exemplary embodiments described, rather may be modified in various forms without departing from the scope of the detailed description, the accompanying drawings, the appended claims, and their equivalents.

What is claimed is:

1. A fuel cell stack comprising:
   a plurality of adjacent electricity generators adapted to generate electric energy through an electrochemical reaction between hydrogen and oxygen, each electricity generator including:
      a membrane-electrode assembly; and
      a pair of separators, one separator on each side of the membrane-electrode assembly, wherein a separator and an adjacent separator of an adjacent electricity generator each include ribs and grooves that together define a plurality of cooling channels extending along a first direction and having a distribution density that varies across the first direction the distribution density increasing from a circumferential region to a central region of the membrane-electrode assembly.

2. The fuel cell stack of claim 1, wherein the cooling channels are symmetrically distributed with respect to a central line of the membrane-electrode assembly.

3. The fuel cell stack of claim 1, wherein the grooves have a constant width, and wherein the ribs have at least two different widths.

4. The fuel cell stack of claim 3, wherein widths of the ribs gradually decrease from a circumferential region to a central region of the membrane-electrode assembly.

5. The fuel cell stack of claim 1, wherein the ribs have a constant width, and wherein the grooves have at least two different widths.

6. The fuel cell stack of claim 5, wherein the widths of the grooves gradually increase from a circumferential region to a central region of the membrane-electrode assembly.

7. The fuel cell stack of claim 1, wherein each cooling channel has a shape of a straight line.

8. The fuel cell stack of claim 1, wherein the cooling channels are formed as curved lines, and wherein curvatures of the curved lines of the cooling channels gradually increase from a central region to a circumferential region of the membrane-electrode assembly.

9. The fuel cell stack of claim 8, wherein the curved lines of the cooling channels are convex with respect to a central line of the membrane-electrode assembly.

10. The fuel cell stack of claim 8, wherein the curved lines of the cooling channels are concave with respect to a central line of the membrane-electrode assembly.

11. The fuel cell stack of claim 1, wherein each membrane-electrode assembly is coupled to one side of the combined opposite separators forming the cooling channels.

12. A fuel cell stack comprising:
   at least one electricity generator adapted to generate electric energy through an electrochemical reaction between hydrogen and oxygen, the electricity generator including:
      a membrane-electrode assembly;
      separators located on both sides of the membrane-electrode assembly; and
      cooling channels extending along a first direction and having a distribution density that varies across the first direction the distribution density increasing from a circumferential region to a central region of the membrane-electrode assembly; and
   cooling plates located between adjacent electricity generators, wherein the cooling channels comprise a plurality of apertures extending longitudinally through the cooling plates.

13. The fuel cell stack of claim 1, wherein the cooling channels include a plurality of inlets and a plurality of outlets.

14. The fuel cell stack of claim 13, wherein the inlets and the outlets are alternately connected to form one inlet and one outlet for the cooling channels of each electricity generator.

15. A cooling system adapted to dissipate heat generated by electricity generators stacked within a fuel cell, the electricity generators having membrane-electrode assemblies sandwiched by separators, the cooling system comprising:
   cooling channels defined by a first set of ribs and grooves on a first separator and a corresponding second set of ribs and grooves on a second separator adjacent the first separator, and adapted to allow a cooling fluid to flow through the cooling channels,
   wherein the cooling channels are adapted to facilitate a larger heat transfer area between the cooling fluid and the membrane-electrode assembly near central regions of the electricity generators and a smaller heat transfer area near the circumferential regions of the electricity generators and the cooling channels have a distribution density that varies across a first direction.

* * * * *